United States Patent [19]
Ogami

[11] Patent Number: 6,095,422
[45] Date of Patent: Aug. 1, 2000

[54] METHOD AND APPARATUS OF AUTODISCRIMINATING IN SYMBOL READER EMPLOYING PRIORITIZED AND UPDATED TABLE OF SYMBOLOGIES

[75] Inventor: Kenneth Yuji Ogami, Bothell, Wash.

[73] Assignee: Intermec IP Corp., Woodland Hills, Calif.

[21] Appl. No.: 09/383,483

[22] Filed: Aug. 26, 1999

Related U.S. Application Data

[63] Continuation of application No. 09/006,693, Jan. 14, 1998, Pat. No. 5,969,326.

[51] Int. Cl.[7] ....................................................... G06F 7/10
[52] U.S. Cl. ................................ 235/462.27; 235/472.01; 235/494
[58] Field of Search ........................ 235/462.27, 472.01, 235/494

[56] References Cited

U.S. PATENT DOCUMENTS

| | | |
|---|---|---|
| 3,906,202 | 9/1975 | Meyer . |
| 3,916,154 | 10/1975 | Hare et al. . |
| 4,354,101 | 10/1982 | Hester et al. . |
| 4,533,825 | 8/1985 | Yamada . |
| 4,855,581 | 8/1989 | Mertel et al. . |
| 4,859,840 | 8/1989 | Hasegawa et al. . |
| 4,973,830 | 11/1990 | Ouchi et al. . |
| 5,036,182 | 7/1991 | Ouchi et al. . |
| 5,086,215 | 2/1992 | Carsner et al. . |
| 5,184,005 | 2/1993 | Ukai et al. . |
| 5,270,525 | 12/1993 | Ukai et al. . |
| 5,311,001 | 5/1994 | Joseph et al. . |
| 5,329,105 | 7/1994 | Klancnik et al. . |
| 5,336,874 | 8/1994 | Hasewgawa . |
| 5,352,878 | 10/1994 | Smith et al. . |
| 5,455,414 | 10/1995 | Wang . |
| 5,457,309 | 10/1995 | Pelton . |
| 5,537,431 | 7/1996 | Chen et al. . |
| 5,550,365 | 8/1996 | Klancnik et al. . |
| 5,969,236 | 1/1999 | Ogami ............................ 235/462.27 |

*Primary Examiner*—Harold I. Pitts
*Attorney, Agent, or Firm*—Perkins Coie LLP

[57] ABSTRACT

A method and apparatus employs a weighted order stored in a weight table for automatically discriminating optical symbols which may be encoded in any one of at least two symbologies. The weighted order may be dynamically updated to reflect the distribution of symbologies as the symbols are acquired and decoded.

32 Claims, 9 Drawing Sheets

START A C O D E space 1 2 8 CHECK STOP
8
VALUE OF 84
TERMINATION BAR

12

ODD PARITY · EVEN PARITY
GUARD PATTERN · GUARD PATTERN
4 0 1 5 · 3 4 7 6
CHECK DIGIT
10

| 104 | 102 | 110 | 106 | 107 | 108 | |
|---|---|---|---|---|---|---|
| 3/6 | 3 |  | 0 | 0 | 0 | 1 |
| 1/6 | 1 |  | 0 | 0 | 0 | 2 |
| 1/6 | 1 |  | 0 | 0 | 0 | 3 |
| ⋮ | ⋮ | ⋮ | ⋮ | ⋮ | ⋮ |  |
| 0 | 0 |  | 0 | 0 | 0 | N |

*Fig. 7A*

| 104 | 102 | 110 | 106 | 107 | 108 | |
|---|---|---|---|---|---|---|
| 15/36 | 2 | −3/36 | −3/36 | 0 | 0 | 1 |
| 13/36 | 2 | +7/36 | +7/36 | 0 | 0 | 2 |
| 7/36 | 1 | +1/36 | +1/36 | 0 | 0 | 3 |
| ⋮ | ⋮ | ⋮ | ⋮ | ⋮ | ⋮ |  |
| 0 | 0 | 0 | 0 | 0 | 0 | N |

*Fig. 7B*

| 104 | 102 | 110 | 106 | 107 | 108 | |
|---|---|---|---|---|---|---|
| 51/216 | 1 | −57/216 | −3/36 | −39/216 | 0 | 1 |
| 85/216 | 2 | +49/216 | +7/36 | +7/216 | 0 | 2 |
| 143/216 | 1 | +7/216 | +1/36 | +1/216 | 0 | 3 |
| ⋮ | ⋮ | ⋮ | ⋮ | ⋮ | ⋮ |  |
| 1/6 | 1 | 1/6 | 0 | +1/6 | 0 | N |

*Fig. 7C*

METHOD AND APPARATUS OF AUTODISCRIMINATING IN SYMBOL READER EMPLOYING PRIORITIZED AND UPDATED TABLE OF SYMBOLOGIES

CROSS-REFERENCE TO RELATED APPLICATION

This application is a continuation of U.S. patent application Ser. No. 09/006,693, filed Jan. 14, 1998 now U.S. Pat. No. 5,969,326.

TECHNICAL FIELD

The present invention relates generally to the field of optical symbol reading and decoding, and more specifically to a method and apparatus for autodiscriminating in a symbol reader.

BACKGROUND OF THE INVENTION

A symbol reader is a device used to extract information optically encoded in a machine-readable symbol and convert it into computer-compatible digital data. Typical machine-readable symbols include bar code symbols having varying width dark bars and light spaces. The decoded data can be transmitted directly to an attached computer, stored locally for later dumping, or used locally with an application program resident in the symbol reader. The symbol reader can be considered as two separate elements: the input device, and the decoder. These two elements can reside in separate physical packages connected by a cable or other communications link, or they can be combined in a single unit.

The input device is a unit that employs electro-optical techniques to scan the symbol. The actual scanning motion may be provided by the operator's hand motion, by an internal scanning system, or by movement of the symbol past the input device. The input device produces an instantaneous electrical output that is representative of the localized reflectivity of the symbol at the point that is being scanned. The input device is usually an active system, wherein it illuminates the symbol with light energy, then examines the amount of light reflected by a localized area of the symbol. The symbol light areas will reflect more light than the dark areas. The light reflected from the symbol is directed to an optical receiver such as a photodiode detector or charge-coupled detector (CCD), which generates a small current proportional to the amount of light returned. An amplifier in the input device increases the signal from the optical receiver to a useable level. In order to differentiate between the light and dark areas, the analog voltage is often converted into a digital wave form by a circuit known as the wave shaper. The output voltage of an input device can be either analog or digital. If the output is analog, the wave shaper function may be incorporated in the input device or in the decoder unit.

The decoder part of the symbol reader analyzes the signal produced by the input device and deciphers the information encoded in the symbol. The resulting data is either transmitted to an attached computer, stored locally for later transfer, or forwarded to an application program resident in the decoder itself. In the typical symbol reader, this function is usually implemented in software running on a microprocessor, but it might also be realized by traditional hardwired logic. Whichever implementation is used, the following steps are included: (1) Determine whether the input device's optical beam is currently on a dark area or light area of a symbol; (2) Measure the width of each bar and space element as the input device's optical beam is scanned through the symbol; (3) Identify the symbol's element widths; (4) Decode the symbol's encoded data characters by comparing the identified element widths to a table of valid values for each character in the character set; (5) If necessary, reverse the order of the decoded data characters to accommodate symbols that have been scanned right to left; and (6) Perform additional checks to confirm the validity of the scan.

There are currently a large variety of symbologies in use, including bar code symbologies. Bar code symbologies fall into two general categories: discrete and continuous. In a discrete code, each character can stand alone and be decoded independently from the adjacent characters. Each character is separated from its neighbor by loosely toleranced intercharacter gaps, which contain no information. Every character has a bar on each end. A continuous code symbology has no intercharacter gaps. Every character begins with a bar and ends with a space. The end of one character is indicated by the start of the next character. Examples of bar code symbols include the universal product code (UPC), European Article Numbering System (EAN), interleaved two of five, Codabar, Code 39, Code 128, Code 93, Code 49, and Code 16k. A variety of two-dimensional codes or area codes also exist. Popular area codes include: CodeOne, DataMatrix, Codablock, USD-5, Vericode, Datacode, UPScode, and PDF417.

Most reading equipment includes the capability to decode several different symbologies. The user configures their reader to the desired choice by setting switches, scanning control labels, or receiving commands from the host computer. Readers are also available that can automatically recognize which symbology has been scanned, then use the appropriate decoding algorithm. The data is decoded independently of the symbology used. Called autodiscrimination, this feature is extremely useful when several different symbologies are encountered in a given application. The operator configures the reader with a list of symbologies that will be allowed by setting switches or scanning control labels. For each symbol scanned, the symbol reader must search through a large number of tables corresponding to each of the allowed symbologies in an attempt to find a match. In an effort to speed up the search, many symbol readers attempt to decode using the table for the most recently decoded symbology first.

Limiting the list of symbologies is advisable for a couple of reasons. It minimizes the probability that an inadvertent scan of a random symbol will result in incorrect data being gathered. This, in turn, affects data security. Although the theoretical probability of a symbology recognition error is very low, there is a finite probability of a partial scan of one symbology's being recognized as a valid scan in another symbology. For many symbology combinations, this appears to be a small problem, but localized printing errors or extraneous markings on the substrate can combine with partial scans to create an operational concern. Limiting the list will also speed up the decoding process in most readers.

SUMMARY OF THE INVENTION

The present invention overcomes the limitations of the prior art by providing an automated method of decoding symbols comprising the steps of acquiring a first symbol and successfully applying a series of symbology translations to the acquired first symbol in a weighted order until the first symbol is decoded. The method can further comprise the step of periodically updating the weighted order. In one exemplary embodiment, the method may be realized by maintaining a table of weights, each of the weights corresponding to a number of times or frequency with which a symbology translation has been successfully employed in decoding a one of the symbols.

The present invention also provides, a symbol reader that in an exemplary embodiment includes an optical source configured to illuminate a symbol with an optical beam, an optical receiver configured to receive the optical beam after the optical beam is reflected from the symbol and to produce a set of data corresponding to reflected optical beam. The symbol reader further includes a memory, the memory including a weighted average information, and a microprocessor in operational communication with the optical receiver and the memory, responsive to weighted average information to apply a series of translations to the set of data in a weighted order which corresponds to the weighted average information.

The input device and the decoder may be implemented as separate interconnected units, or may be implemented in a single device.

BRIEF DESCRIPTION OF THE DRAWINGS

FIGS. 7A–7C are successive views of a two-dimensional array used to practice a method of the invention according to a third exemplary embodiment.

DETAILED DESCRIPTION OF THE INVENTION

Figure 1A:
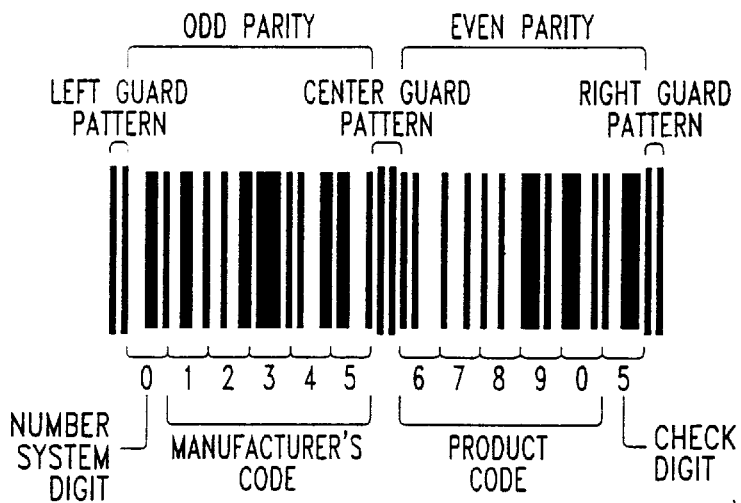
FIGS. 1A–1J are views of prior art symbols of various symbologies, including one-dimensional bar codes and two-dimensional matrix codes.
Figure 1B:
Figure 1C:
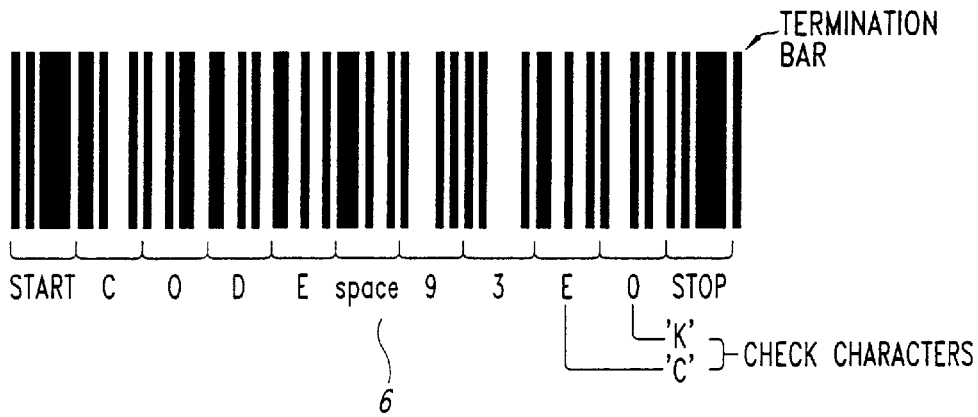
Figure 1D:
Figure 1E:
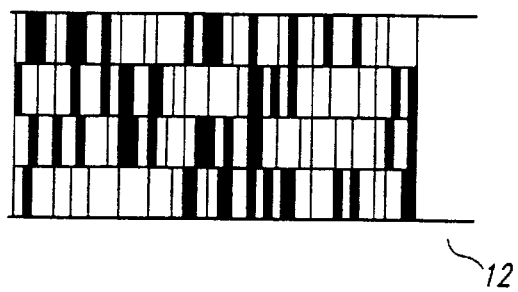
Figure 1F:
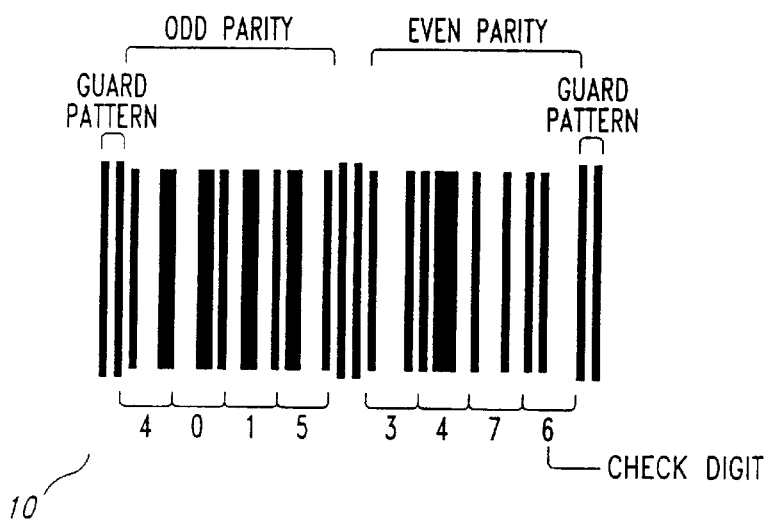
Figure 1G:
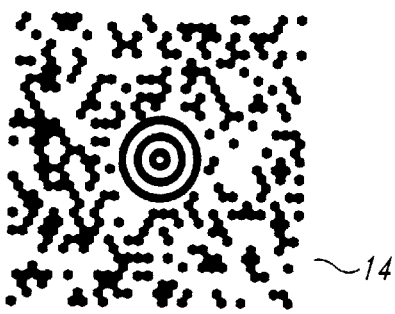
Figure 1H:
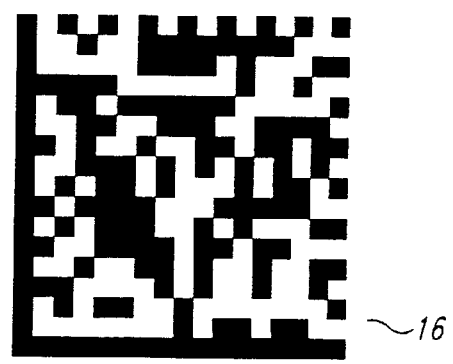
Figure 1I:
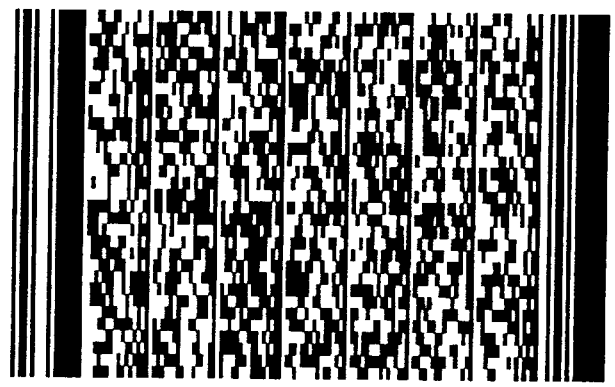
Figure 1J:
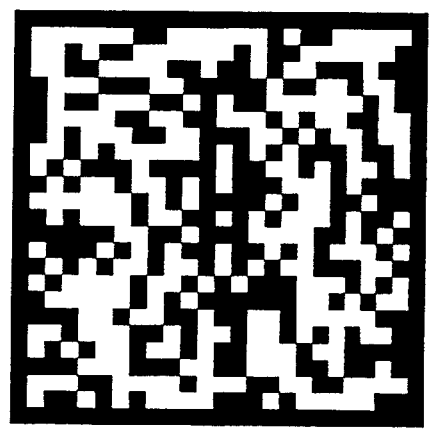

An apparatus and method for autodiscriminating between a variety of symbologies is described in detail herein. In the following description, numerous specific details are set forth such as particular symbologies, arrays and data structures, weighting formulas and scanning apparatus, in order to provide a thorough understanding of the invention. One skilled in the relevant art, however, will readily recognize that the present invention can be practiced without specific details, or with other such details. In other instances, well-known structures and operations are not shown in detail in order to avoid obscuring the present invention.

FIG. 1 shows a sample of optical symbols from a variety of the optical symbologies which are available for identification purposes. The samples include a Universal Code Symbol (UPC) 2, a Code 39 symbol 4, a Code 93 symbol 6, a Code 128 symbol 8, and a European Automatic Numbering system symbol (EAN) 10. These symbols 2–10 are all one-dimensional or linear bar code symbols. The linear symbologies store information in a parallel arrangement of varying width bars and spaces. The linear symbologies can also store information in a multiplicity of rows, as is done in the Code 16k symbol 12. Matrix symbologies encode their data in the two-dimensional areas of a symbol, such as United Parcel Service's symbol (UPS) 14, Datacode symbol 16, PDF417 symbol 18, and Vericode symbol 20.

Figure 2:
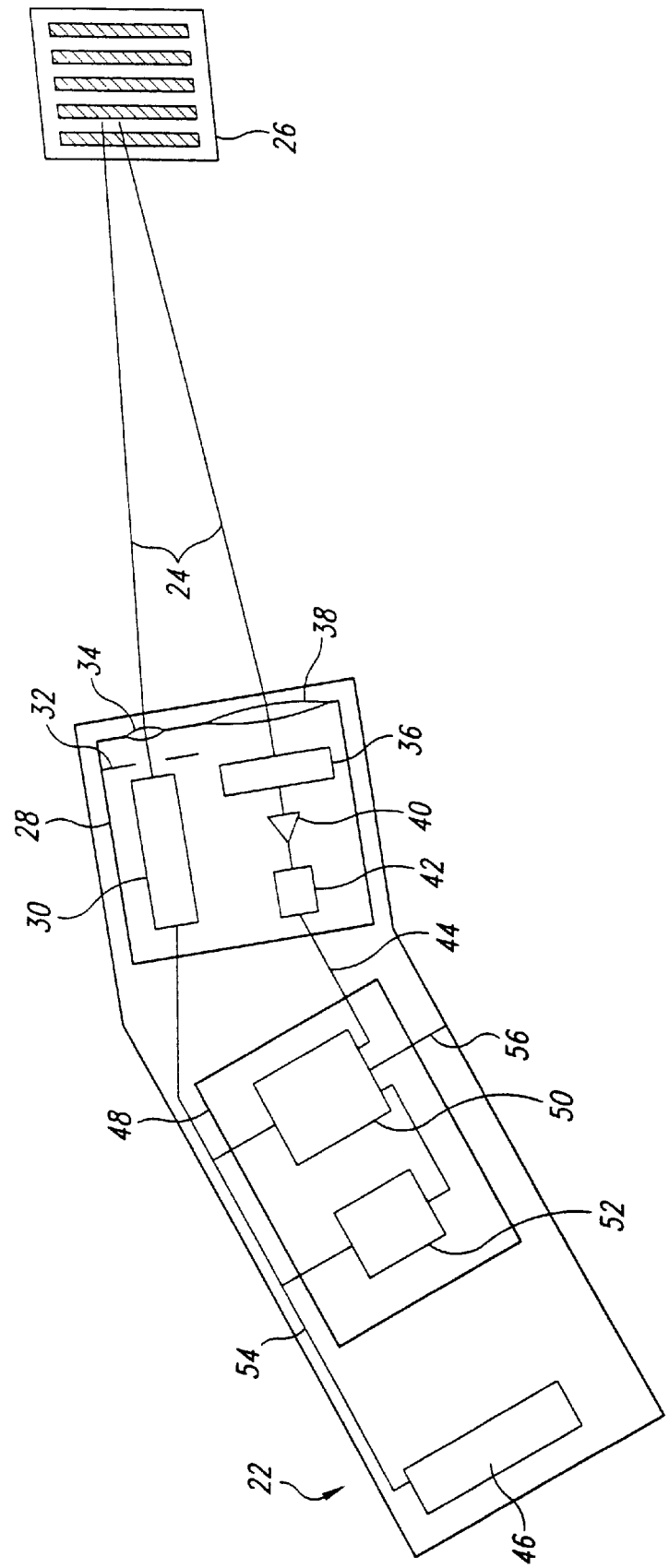
FIG. 2 is a cross-sectional, block diagram view of an exemplary embodiment of a symbol reader according to the invention.

As shown in FIG. 2, an embodiment of the present invention is incorporated in a symbol reader 22, which employs an optical beam 24 to read a symbol 26. The symbol reader 22 includes an optical scanner 28 having an optical source 30 for producing the optical beam 24. The optical source 30 may pass the beam 24 through a baffle 32 and an optical lens 34. The optical source 30 may take the form of a visible or near-visible light source, such as a light-emitting diode (LED), incandescent light source, or focused beam devices such as helium neon lasers or solid state laser diodes. The optical scanner 28 may also include conventional mechanisms for scanning the optical beam 24, such as revolving polygons or oscillating mirrors (not shown).

The optical scanner 28 further includes an optical receiver 36 for receiving the optical beam 24 after it is reflected from the symbol 26. Rather than scanning the transmitted light beam, it is also possible to scan the received light path as a whole with modern electronic detectors. This type of scanner is often referred to as a CCD scanner because of the use of charge-coupled device (CCD) semiconductor technology used for the photodiode array sensor or other image sensors. A CCD scanner is able to scan the received light path without any moving parts. A stationary flood illumination scheme is employed, and an image of the symbol is optically transferred to a linear array of multiple adjacent photodetectors. The array contains a sufficient number of photodiodes so that at least two photodiodes receive light from one of the narrowest elements to be resolved. The actual scanning motion is achieved by electrically scanning each of the individual photodiodes in a sequential manner. Because there are so many diodes, and because they are very close together, the electrical output is a smooth wave form. An optical lens 38 may be provided for focusing the reflected optical beam 24 onto the optical receiver 36. The optical receiver 36 may be formed as a photodiode array sensor, such as a charge-coupled device (CCD).

The optical scanner 28 may further include an amplifier 40 for amplifying the signal from the optical receiver 36 and a wave shaper 42 for converting an analog voltage from the amplifier 40 into a digital signal which comprises a set of data 44, often in the form of a time-varying binary signal switching between either of two states.

The optical source 30 may be powered from an external source, or an internal source such as a rechargeable battery 46.

With continuing reference to FIG. 2, a decoder 48 may be provided within the symbol reader 22. Alternatively, the decoder may be external to the symbol reader 22 and may take the form of a programmed general purpose computer (not shown). In the exemplary embodiment shown in FIG. 2, the decoder 48 includes a microprocessor 50 and a memory 52. The microprocessor 50 has an input port for receiving the set of data 44 generated by the optical receiver 36. The microprocessor 50 also has input and output ports for communicating with an input and an output port of the memory 52. The microprocessor 50 and the memory 52 may receive electrical energy from the battery 46 through a power bus 54. The microprocessor 50 further has an output port 56 for relaying decoded symbol information to any of a variety of devices. The memory 52 contains a table of symbols for each symbology that the reader can decode. The microprocessor 50 and the memory 52 are configured to perform as an automated discriminator for selectively applying an appropriate symbology translation selected from the tables to the set of data 44. A counter (not shown) may be implemented in the microprocessor 50 for counting the number of symbols successively decoded using each symbology.

Figure 3:
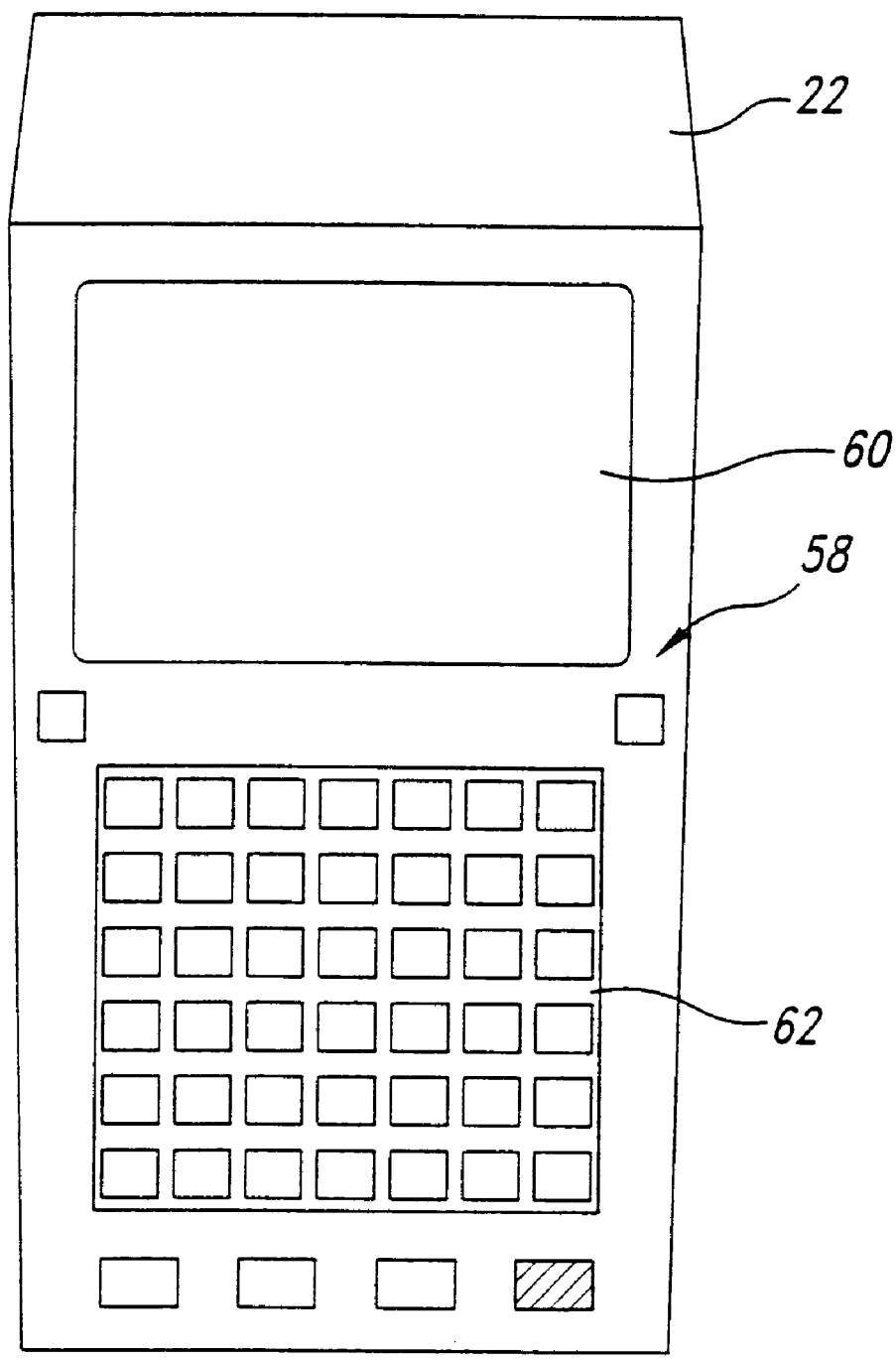
FIG. 3 is a top plan view of the symbol reader of FIG. 2.

With reference to FIG. 3, the symbol reader 22 includes a user interface 58 which may include a display screen 60 and a user input device 62. While the user input device 62 is shown as comprising of a set of keys in the exemplary embodiment, the user input device 62 may take the form of a mouse, a touch screen, a trackball, a light pen, or any of a variety of conventional user input devices. The user input device may also take the form of a memory device (not shown) preconfigured with desired user input information. An appropriate memory device is selected by the user and loaded into a port (not shown) in the symbol reader 22. The user input device 62 is preferably in data communication with the microprocessor 50 (FIG. 2). The user input device 62 may be used for loading a weight table into the memory 52, or for loading or updating a weight factor in the memory 52. The user input device may also be used to load or remove a symbology table from the symbol reader 22.

Figure 4:
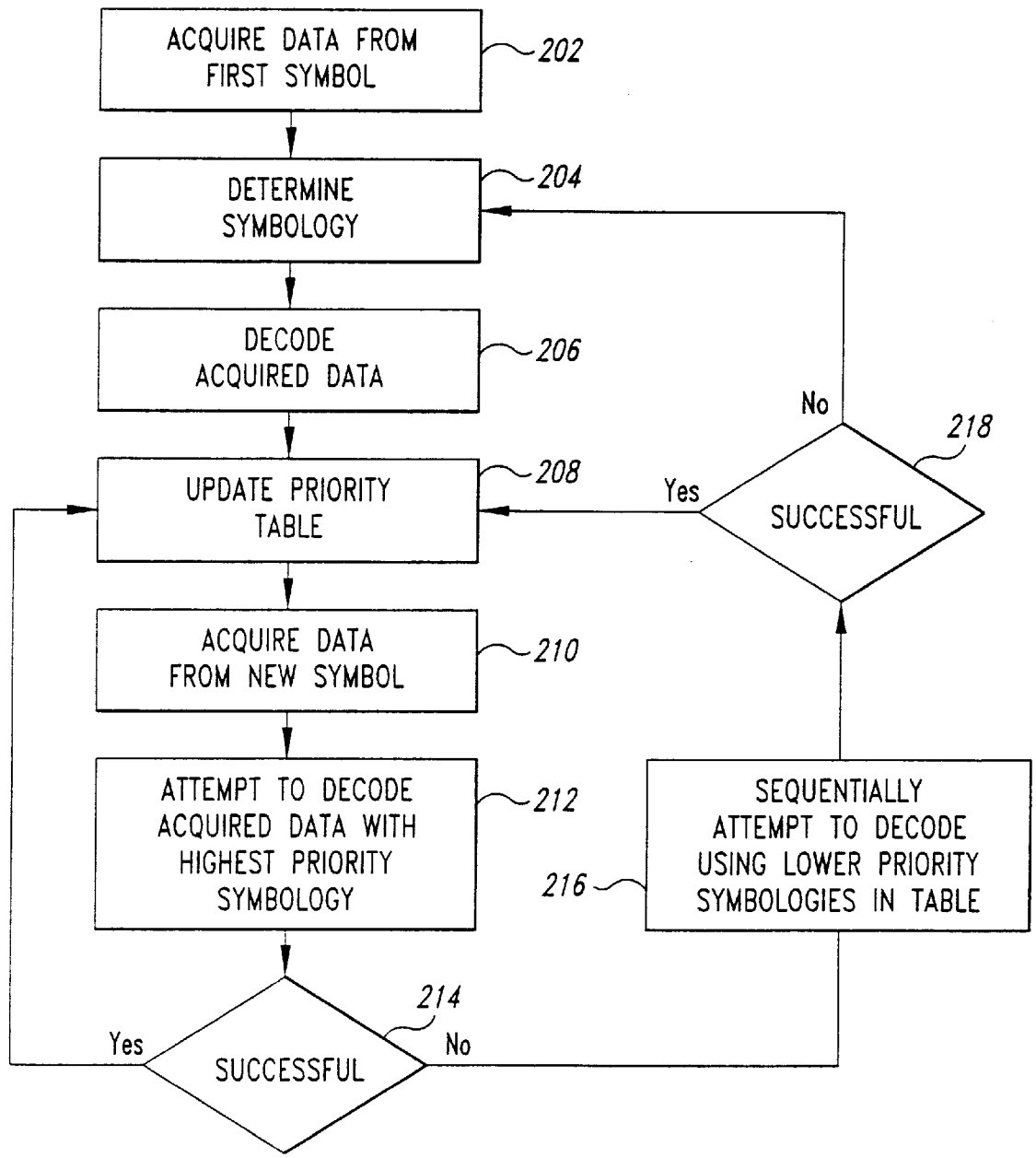
FIG. 4 is a flow chart of the steps for practicing a method of the invention according to an exemplary embodiment.

An exemplary method will be discussed with reference to FIGS. 2 and 4. In step 202, a first symbol 26 is scanned by directing light 24 produced by the optical scanner 28 to the first symbol 26 and receiving the reflected light 24 with the optical receiver 36. The optical receiver 36 converts the received light 24 into a digital signal. In step 204, the microprocessor 50, determines the symbology to which the scanned first symbol 26 belongs. Many symbologies have unique start and stop characters, which permit the symbology to be easily recognized through the use of lookup tables. Alternatively, trial and error attempts at decoding the symbology with each of the symbologies loaded in the symbol reader 22 may be made by the microprocessor 50.

Once the appropriate symbology has been determined, the microprocessor 50 decodes the digital signal in accordance with step 206. The decoding is usually accomplished through the use of a set of lookup tables stored in the memory 52. The lookup tables store data corresponding to the symbol pattern for each character of each symbology loaded in the symbol reader 22. In step 208, a weighted order table is updated (as described below) to reflect the updated frequency with which symbologies are being used to decode the symbols 26. In step 210, a new symbol 26 is scanned. In step 212, the microprocessor 50 attempts to decode the new symbol 26 with the symbology having the highest priority. The priority will most often correspond to the frequency with which symbols of each symbology are decoded, the highest priority given to the most frequently occurring symbology. In step 214, it is determined whether or not the symbol was successfully decoded based on the highest priority symbology. If the decode is successful, then the weighted order table is updated in accordance with step 208. If the decode is unsuccessful, decoding with each of the remaining symbologies will be attempted in order of their priority, or weighted order as in accordance with step 216. In step 218, the success of decoding with the lower priority symbologies is tested, the weighted order table being updated (step 208) each time a decode is successful. If no symbology is successful in decoding the symbol, an error message may be issued.

Figure 5A:
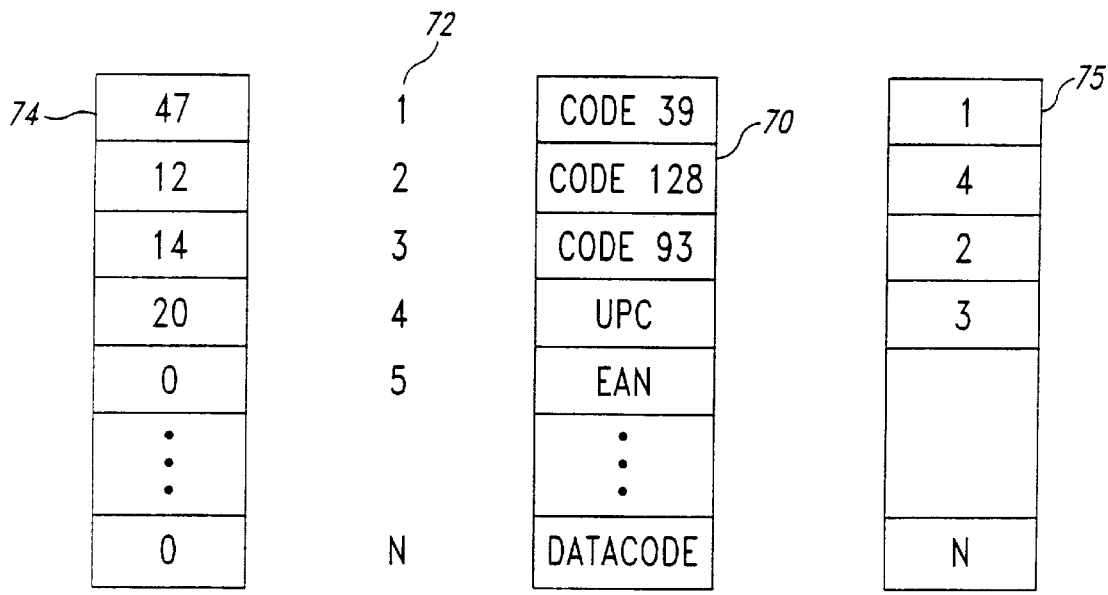
FIG. 5A is a schematic diagram of a pair of arrays for practicing a method of the invention according to a first exemplary embodiment.
Figure 5B:
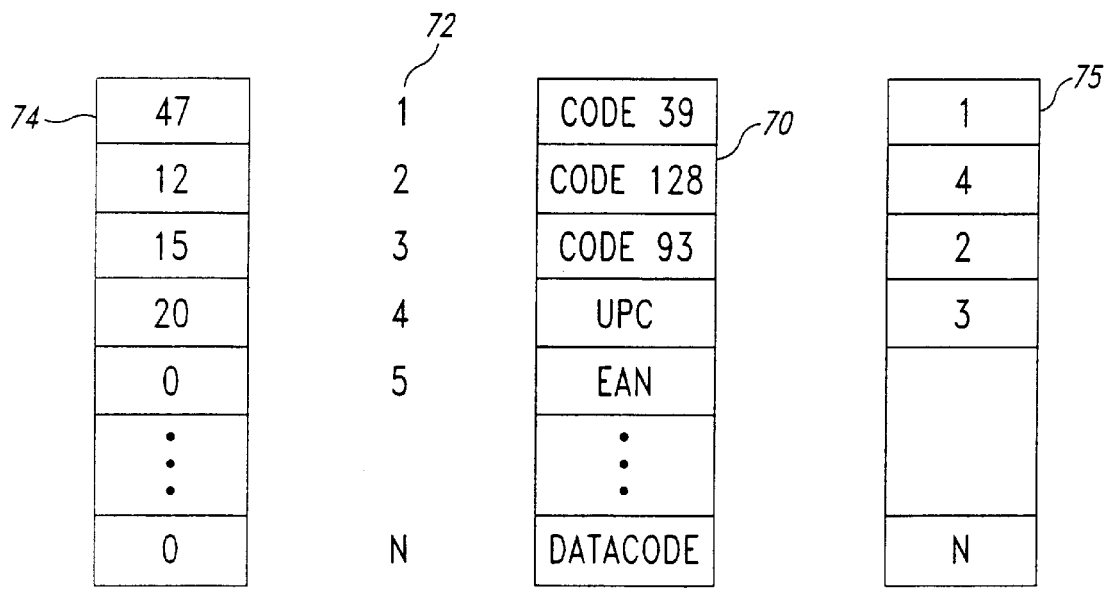
FIG. 5B is a view of the arrays of FIG. 5A after performing an iteration of the method.

With reference to FIGS. 5A and 5B, a set of arrays for performing the method of the invention according to a first exemplary embodiment are shown. The arrays may be stored in the memory 52 (FIG. 2) for manipulation by the microprocessor 50 (FIG. 2). A first one-dimensional array 70 stores the names or other identifying data of the symbologies which the decoder 48 is capable of autodiscriminating between. The array 70 is referenced through an index 72. A second one-dimensional array 74 stores values which are equal to the number of times each respective symbology has been used by the decoder 48 to decode a symbol 26. The first array 70 and the second array 74 share the index 72 so that the values stored in the second array 74 directly correlate to the corresponding symbologies. In the example shown in FIG. 5A, the names or identifiers of a number N of symbologies are shown stored in the first array 70. At this point, a total of eighty-three symbols have been decoded by the symbol reader, forty-seven of the decoded symbols correspond to the Code 39 symbology, twelve of the decoded symbols correspond to the Code 128 symbology, fourteen of the decoded symbols correspond to the Code 93 symbology, and twenty of the decoded symbols correspond to the UPC symbology. FIG. 5B shows the first and second arrays 70, 74 after an additional symbol, in the Code 93 symbology, has been scanned and decoded. Note that the value at the index 72 equal to 3 in the second array 74 has been updated from 14 to 15.

In this embodiment, each entry in the array 74 corresponds to a weight assigned to a respective symbology from the first array 70. As each new symbol is scanned, a series of symbology translations or transformations may be applied to the set of data 44 representing the symbol 26, the translations being applied in a weighted order which corresponds to the weights in the array 74. For example, the weighted order would most likely run successively from the largest weight to the lowest weight. The weighted order may be determined by examining or sorting the weights stored in the second array 74 using conventional sorting algorithms. Additionally, a table of weights 75 for storing the symbology identifiers in the weighted order may be implemented as a third one dimensional array. The table of weights 75 stores the values of the index 72 which corresponds to the name or identifier of the respective symbologies. The table of weights 75 stores the values of the index 72 in their weighted order. For example, in FIGS. 5A and 5B, the table of weights 75 stores in its first position the value 1, which is equal to the index 72 that corresponds to the most frequently used symbology, Code 39. The table of weights 75 stores in its second position the value 4, which is equal to the index 72 that corresponds to the second most frequently used symbology, UPC. Likewise, the table of weights 75 stores in its third and fourth positions the values 2 and 3, which are equal to the index 72 that corresponds to the third and fourth most frequently used symbologies, respectively Code 93 and Code 128. The software regularly updates the table of weights 75. A user input may be accepted for modifying the weights stored in the weight table 75, so as to influence the weighted order. Where more than one symbology has the same weight, the most recently used symbology can be given priority in the weighted order.

As shown in FIGS. 6A–6G, an alternative second exemplary embodiment under the present invention includes steps that are similar to those of the first exemplary embodiment.

Figure 6A:
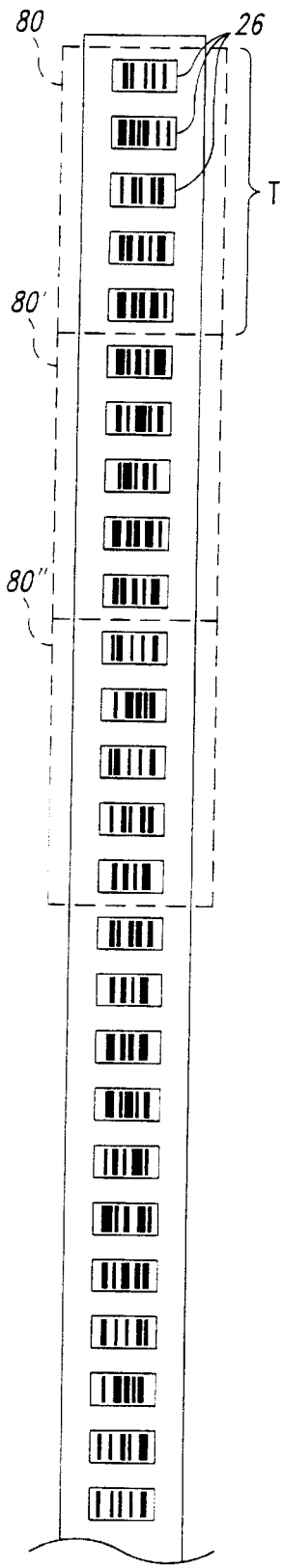
FIG. 6A is a schematic diagram of a plurality of symbols.
Figure 6B:
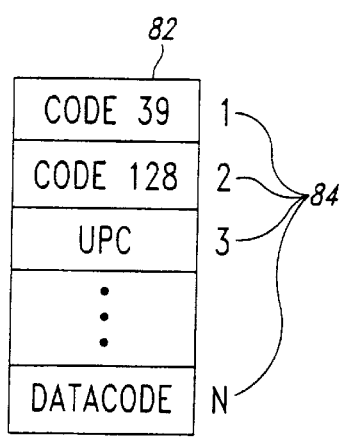
FIG. 6B is a view of a one-dimensional array for storing symbology identification information.

This alternative embodiment, and those described herein, are substantially similar to previously described embodiment, and common steps are identified by the same reference numbers. Only the significant differences in operation are described in detail. The second exemplary embodiment is shown and described with reference to FIGS. 6A–6G, where more recent occurrences of symbologies are given more weight than older occurrences. This helps increase the speed of decoding when symbols of a given symbology occur in groups. With reference to FIG. 6A, a plurality of symbols 26 are shown. A window 80 is defined, the window corresponding to some number T of symbols. In the second exemplary embodiment, as shown in FIG. 6A, the window 80 corresponds to a number T equal to 5 symbols. The window size T directly affects the frequency with which the table of weights will be updated. The window size should be selected so that the table is updated at a reasonable rate, but not so often that the computations associated with the update consume a prohibitively large proportion of the microprocessor's 50 bandwidth. With reference to FIG. 6B, a first array 82 is dimensioned for storing the name or identifier of the symbologies which the decoder 48 is programmed to autodiscriminate and decode. The first array 82 is referenced through an index 84.

Figure 6C:
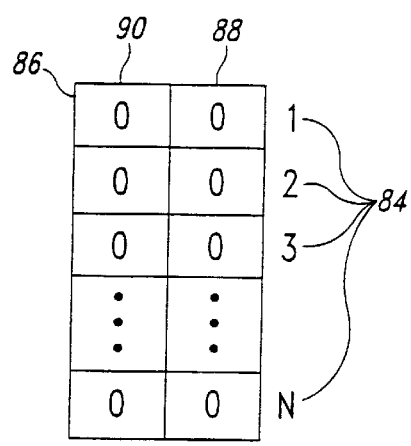
FIG. 6C–6G are successive views of a two-dimensional array for practicing a method of the invention according to a second exemplary embodiment.
Figure 6D:
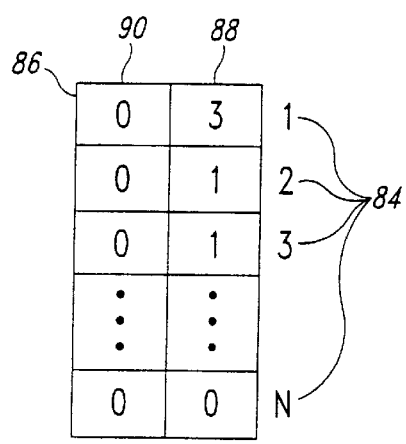

A second array 86 includes a window count column 88 for storing values equal to the total number of times that a respective symbology has been used to decode a symbol in a given window. The array 86 also includes a weighted sum column 90, which stores a value equal to a weighted sum of the cumulative count for each of the respective symbologies. FIGS. 6C–6G provide an example of the successive values of the second array 86 as the window 80 iterates through the plurality of symbols 26. FIG. 6C shows the second array 86 prior to the scanning of the first symbol 26. Each of the values in the second array 86 are equal to zero. FIG. 6D shows the values in the second array 86 after the first window of symbols 80 has been scanned. In this example, three instances of Code 39 symbols were decoded, one instance of a Code 128 symbol was decoded, and one instance of a UPC symbol was decoded. The values in window count column 88 have been updated to reflect this first window of symbols 80.

Figure 6E:
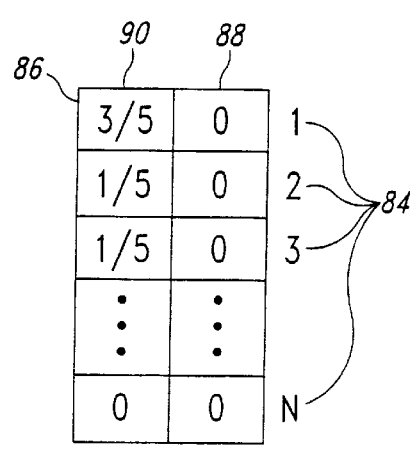

FIG. 6E shows the second array 86 just prior to scanning the second window 80' of symbols 26. Weighted sum column 90 has been updated by storing the weighted sum of the cumulative count of each the respective symbols divided by a weight value. For example, a weight value equal to the window size of 5 is selected. Hence, the values of 3/5, 1/5, and 1/5 are stored in the weighted sum column of array 86 in the rows corresponding to the Code 39, Code 128, and UPC symbologies, respectively. The values in the window count column 88 are then zeroed out in preparation for the next window of symbols 80'.

It should be noted that although floating point values may be used, arrays of integer values are preferred to permit rapid computation, as well as for efficient use of the information stored in the arrays. One method for maintaining 16-bit accuracy while operating on fractional values in an integer array is to multiple any numbers relating to the dividend in a division operation by the value 256. In terms of the microprocessor 50, the multiplication by 256 is simply a shift of 8 bit positions in the direction of increasing value. The division of the resulting dividend by a devisor having 8-bit precision will result in a 16-bit value where the quotient is in the upper 8 bits and the lower 8 bits represents a fractional value. This method will also work where the dividend is multiplied by 65,536, which corresponds to a shift of 16-bit positions, and the divisor has 16-bit precision, the resulting quotient having 32-bit precision. Using 32-bit values provides extended dynamic range over a 16-bit value. These integer values can be referred to as fixed point fractional values.

Figure 6F:
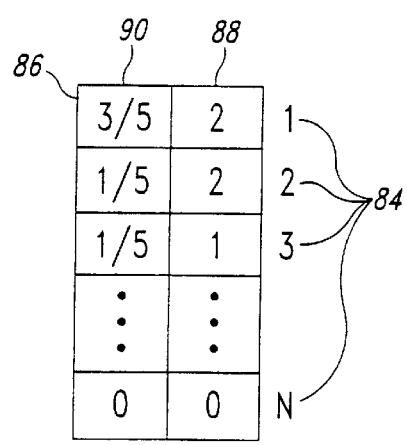
Figure 6G:
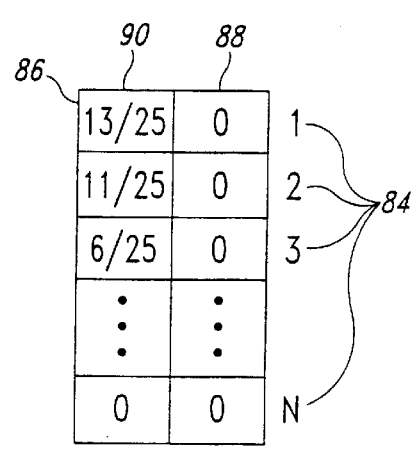

FIG. 6F shows the values of the second array 86 just after the symbols 26 of the second window 80' have been scanned and decoded. In this example, two instances of Code 39 symbols, two instances of Code 128 symbols, and one instance of a UPC symbol were decoded in the second window 80'. The window count column 88 is updated accordingly. FIG. 6G shows the values of the second array 86 just prior to scanning the symbols of the third window 80''. The values of the weighted sum column 90 are updated to reflect the occurrence of the respective symbols. For example, the existing weighted sum of the cumulative count for Code 39 symbols, 3/5, is divided by 5, which is the weight, to arrive at the dividend 3/25. To this value is added 2/5, which is the dividend of the new total of Code 39 symbols in the second window 80', which is equal to 2, and the weight, which is equal to 5. Therefore, the weighted sum of the cumulative count for Code 39 symbols is 13/25, the sum of 3/25 and 2/5. Mathematically, the value for the weighted sum of any given symbology is given by the following formula, where "i" is the current window:

$$\text{Weighted\_Sum}_i = (\text{Weighted\_Sum}_{i-1}/\text{Weight}) + (\text{Window\_Total}_i/\text{Weight}) \quad (1)$$

The weighted sums for Code 128 and UPC symbologies are likewise computed, as shown in FIG. 6G.

The equation (1) above may employ multiplication instead of division, where for instance, the counts are given in terms of frequency (i.e. 1/count). The weight chosen is preferably equal to or greater than the size of the window T. Selecting a value equal to or greater than T ensures that the weighted sum will never be greater than 1. Again, the software method of FIG. 4 may be employed to apply symbology translations in an order which corresponds to the weighted order defined by the weighted sums in the second column 90 of the second array 86.

With reference to FIG. 7, a two-dimensional array 100 is shown for implementing a method according to a third exemplary embodiment of the invention. The method works with the plurality of symbols 26 and the window 80 as shown in FIG. 6A, and with a similar name or identifier array 84 as shown in FIG. 6B. The array 100 includes a window count column 102 which stores values equal to the number of times that a respective symbology has been employed to decode a symbol 26 in a given window. A weighted sum column 104 stores the values which are equal to a weighted sum of the cumulative count for each of the respective symbologies. A set of rate columns 106, 107, 108 are provided for storing rate information for each of the respective symbologies.

As defined above in equation (1), the weighted sum is equal to the sum of the prior weighted sum divided by the weight and the current window count divided by the weight. The rate is equal to the current weighted sum minus the previous weighted sum, and is given by the equation, where "i" is the current window:

$$\text{Rate}_i = \text{Weighted\_Sum}_i - \text{Weighted\_Sum}_{i-1} \quad (2)$$

The number of rate columns 106–108 can be increased or decreased according to the needs of the system and the user. Each of the rate columns 106–108 represents the change between successive pairs of windows. For example, the first rate column 106 will represent the change between the first window 80, which includes the first five symbols 26, and the second window 80', which includes the second five symbols 26. Likewise, the second rate column 107 will represent the change between the second window 80', or second set of five symbols 26, and the third window 80", or third set of five symbols 26. Once each of the rate columns have been successively filled, the process begins again starting with the next successive window, and successively overwriting each of the rate columns as each successive window is processed. The value of the most current rate may be identified through the use of a pointer which is updated each time the rate information is updated. An average weight column 110 is provided for storing the average value of the rates for each of the respective symbologies. The average weight is used to moderate the noise which appears in the individual rates as erratic changes in direction and amplitude, and which corresponds to the ever changing frequency counts for the symbologies. In order to increase computational efficiency, the average need not be divided by the total number of rates, as this would only scale the rate average across all symbologies, and not affect the relative values between the symbologies. It should be noted that the value selected for the weight inversely affects the retention of old information in the weighted sum. In other words, the greater the weight, the less the old information influences the weighted sum.

With reference to FIG. 7A, the values of the array 100 are shown just after reading and decoding the first window 80 of symbols 26. In this example, three instances of Code 39, one instance of Code 128, and one instance of UPC symbols have been encountered. The weight value chosen in this example is 6. In practical embodiments the weight may be significantly larger. The weighted sums for Code 39, Code 128, and UPC symbologies are $3/6$, $1/6$, and $1/6$, respectively.

No rate information is generated since this is the first window to be read and decoded. With reference to FIG. 7B, the values of the array 100 are shown after reading and decoding the symbols 26 of the second window 80' (FIG. 6A). Two instances of Code 39, two instances of Code 128, and one instance of UPC symbols were encountered in the second window 80'. In this instance, since a prior window had been processed, rate information can be calculated and stored in the first rate column 106. For example, with respect to the Code 39 symbology which is stored in the row indexed by 1, the prior weighted sum $3/6$ is subtracted from the current weighted sum $15/36$ to give a rate of $-3/36$. The sign of the rate provides an indication of the direction, while the size provides an indication of the magnitude of the change. The average rate of change 110 is the sum of all of the stored rate of changes 106–108 and is therefore equal to $-3/36$. Similar calculations are performed for all the other symbologies stored in the table.

With reference to FIG. 7C, the array 100 is shown with the values as they appear after reading and decoding a third window 80", comprising the third set of five symbols 26. In the third window 80", one Code 39 symbol, two Code 128 symbols, one UPC symbol, and one Datacode symbol were encountered. The window count column 102 has been correspondingly updated. The weighted sums 104 are also correspondingly updated. For example, with reference to the row indexed by 1, the weighted sum is equal to the prior weighted sum, $15/36$, divided by the weight, 6, plus the current window count, 1, divided by the weight, 6. The new weighted sum for the Code 39 symbology is equal to $15/216 + 36/216$, or $51/216$. The second rate column 107 is updated, by calculating the difference between the new weighted sum and the previous weighted sum. The average weight 110 is calculated by summing the first rate and the second rate. In this embodiment, the average weight column 110 may serve as the weight table, or may by used to influence the weighted order of a weight table (not shown).

Although specific embodiments of the automated discriminator and method of autodiscrimination, and examples of the present invention have been described above for illustrative purposes, various equivalent modifications may be made without departing from the spirit and scope of the invention, as will be recognized by those skilled in the relevant art. The teachings provided herein of the present invention can be applied to other symbol readers and symbologies, not necessarily the exemplary symbol reader and symbologies generally described above. For example, a hardwired system or programmed general-purpose computer could be substituted for the microprocessor. The arrays and data structures for manipulating the information may be significantly modified, as well as, the formulas, from those described above while still realizing advantages of the invention. The terms weight, weights, weight table and weighted order in the most basic sense apply to a frequency, or a ranking or priority ordered by the frequency with which symbols of a particular symbology occur. As explained above, the terms weight, weights, weight table and weighted order can encompass more complicated formulations, for example placing greater emphasis on more recently occurring symbologies. In another example, the more complicated formulation may include a defined weighting factor which may be provided by a user or by other means. Therefore, the terms weight, weights, weight table and weight order should not be given a restrictive meaning.

These and other changes can be made to the invention in light of the above detailed description. In general, in the following claims, the terms should not be construed to limit the invention to the specific embodiments disclosed in the specification and claims, but should be construed to include all apparatus and methods for scanning and autodiscriminating symbols. Accordingly, the invention is not limited by the disclosure, but instead its scope is to be determined entirely by the following claims.

I claim:

1. An automated method of decoding a number of symbols, the symbols being encoded in one of at least two symbologies, the method comprising the steps of:

acquiring a one of the symbols; and successively applying a series of symbology translations to the acquired symbol in a weighted order until the acquired symbol is decoded.

2. The method according to claim 1, further comprising the step of periodically updating the weighted order.

3. The method according to claim 1, further comprising the step of periodically updating the weighted order to reflect the frequency with which symbols of each of the symbologies have been decoded.

4. The method according to claim 1, further comprising the step of:

maintaining a table of weights, the table of weights containing a weight for each of the symbologies.

5. The method according to claim 1, further comprising the steps of:

maintaining a table of weights, the table of weights containing a weight for each of the symbologies, each of the weights corresponding to a number of times each of the series of symbology translations has been successfully employed to decode one of the symbols; and updating the table after each successful decode.

6. The method according to claim 1, further comprising the steps of:

maintaining a table of weights, the table of weights containing a weight for each of the symbologies, the table of weights containing a weight for each of the symbologies, the weight of each symbology corresponding to a frequency with which a symbol encoded in the symbology has occurred; and updating the table after each successful decode.

7. The method according to claim 1, further comprising the steps of:

maintaining a table of weights, the table of weights containing a weight for each of the symbologies; and selectively updating the table of weights in response to a user input.

8. The method according to claim 1, further comprising the steps of:

maintaining a table of weights, the table containing a weight for each of the symbologies, the weight of each of the symbologies corresponding to a frequency with which a symbol encoded in the symbology has occurred;

accepting a user weighting factor from a user input device; and multiplying the weight from the table of weights and the user weighting factor to determine the weighted order.

9. A method of automatic discrimination to identify a symbology to which a symbol belongs, the method comprising the steps of:

assigning a weighted order to a plurality of symbologies;

iterating through a set of symbologies in order of weight while successively determining if the symbol belongs to one of the symbologies.

10. The method of claim 9, wherein the step of assigning a weighted order includes assigning a weight to each of the symbology translations, the weight corresponding to the frequency with which that symbology translation has decoded the symbol.

11. The method of claim 9, wherein the step of assigning a weighted order includes assigning a weight to each of the symbology translations, the weight corresponding to a product of the frequency with which that symbology translation has decoded the symbol and a weight factor.

12. The method of claim 9, wherein the step of assigning a weighted order includes assigning a weight to each of the symbology translations, the weight corresponding to a product of the frequency with which that symbology translation has decoded the symbol and a user updatable weight factor.

13. An automated discriminator for discriminating a set of data relating to a symbol, the set of data being produced by an optical scanner, the automated discriminator comprising:

a memory having an output port, the memory storing a set of symbology weight information;

a programmed computer having and output port and an input port which receives the set of data produced by the optical scanner and the set of symbology weight information from the memory, the computer being responsive to the set of symbology weight information to successively apply a set of transformations to the data received in a weighted order that corresponds to the set of symbology weight information.

14. The automated discriminator of claim 13, wherein the memory further comprises an input port, the input port of the memory in data communication with the output port of the computer and responsive to an update signal from the computer to update the set of symbology weight information stored in the memory for each set of data.

15. The automated discriminator of claim 13, further comprising:

a user interface in data communication with the memory for selectively updating the set of symbology weight information.

16. The automated discriminator of claim 13, wherein the memory further comprises an input port, the input port of the memory in data communication with the output port of the computer and responsive to an update signal from the computer to update the set of symbology weight information stored in the memory for each set of data, and wherein the automated discriminator further comprises a user interface in data communication with the memory for selectively updating the set of symbology weight information.

17. An article of manufacture having a computer readable program embodied therein for causing a set of data relating to a geometry of an optical symbol to be converted into a set of decoded data, the computer readable program in the article of manufacture comprising the steps of:

storing the set of data relating to a geometry of an optical symbol in a register;

successively applying a set of symbology transformations in a weighted order to the data stored in the register;

applying the set of symbology transformations until the data stored in the register is converted; and updating the weighted order of the set of symbology transformations.

18. A method of operating a symbol reader, the method comprising the steps of:

scanning a symbol to acquire a digital representation of the symbol;

applying a series of symbology translations to the digital representation of the symbol in a weighted order.

19. The method according to claim 18, further comprising the step of:

periodically updating the weighted order of each of the symbology translations.

20. The method according to claim 19, wherein the step of periodically updating the weighted order includes:

maintaining a weighted average table, the weights in the weighted average table corresponding to a number of times that each of the symbology translations has been employed; and updating the weights in the table after each decode of the symbol.

21. The method according to claim 19, wherein the step of periodically updating the weighted order includes maintaining a weighted average table, the weights in the weighted average table corresponding to a value equal the product of a number of times that each of the symbology translations has been employed and a weighting factor; and updating the weights in the table after each successful decode of the symbol.

22. The method according to claim 19, wherein the step of periodically updating the weighted order includes maintaining a weighted average table, the weights in the weighted average table equal to a product of a weighting formula having at least a first parameter corresponding to a number of times each of the symbology translations has been employed.

23. The method according to claim 19, further comprising the steps of:

maintaining a weighted average table corresponding to a number of times each symbology has be successfully employed to decode the symbols; and selectively updating the weighted average table in response to a user input.

24. The method according to claim 18, further comprising the step of:

maintaining a weighted average table, the weights in the weighted average table corresponding to a value equal to the number of times each of the symbology translations has been employed multiplied by a user input weighting factor.

25. The method according to claim 18, further comprising the steps of:

maintaining a weighted average table, the weights in the weighted average table corresponding to the number of times each of the symbology translations has been employed; and selectively updating the weighted average table in response to a user input.

26. A method of decoding symbols encoded in a plurality of symbologies, the method comprising the steps of:

acquiring data from a first symbol;

decoding the data from the first symbol based on a symbology determined from the plurality of symbologies;

updating a priority table to reflect the symbology of the first symbol;

acquiring data from a plurality of additional symbols;

for each of the symbols in the plurality of additional symbols, applying, in a prioritized order, the symbologies in the plurality of symbologies to the acquired data until the acquired data is decoded; and updating the priority table each time a symbol is successfully decoded.

27. The method according to claim 26 wherein the step of updating the priority table includes incrementing a one of a plurality of count values, each of the count values corresponding to a respective one of the symbologies.

28. The method according to claim 26 wherein the step of updating a priority table includes incrementing a one of a plurality of count values, each of the count values corresponding to a respective one of the symbologies; and sorting the count values to defined a weighted order.

29. The method according to claim 26 wherein the step of updating a priority table includes defining a window size;

incrementing a one of a plurality of count values, each of the count values corresponding to a respective one of the symbologies;

for each window of symbols decoded, calculating a weighted sum for each of the symbologies, wherein the weighted sum is equal to a sum of an immediately prior weighted sum for the symbology divided by the widow size and the count value for the symbology divided by the window size.

30. The method according to claim 26 wherein the step of updating a priority table includes defining a window size;

incrementing a one of a plurality of count values, each of the count values corresponding to a respective one of the symbologies;

for each window of symbols decoded, calculating a weighted sum for each of the symbologies, wherein the weighted sum is equal to a sum of an immediately prior weighted sum for the symbology divided by the widow size and the count value for the symbology divided by the window size; and for each symbology, calculating a rate value.

31. The method according to claim 26 wherein the step of updating a priority table includes defining a window size;

incrementing a one of a plurality of count values, each of the count values corresponding to a respective one of the symbologies;

for each window of symbols decoded, calculating a weighted sum for each of the symbologies, wherein the weighted sum is equal to a sum of an immediately prior weighted sum for the symbology divided by the widow size and the count value for the symbology divided by the window size;

calculating an average weight value; and sorting the average weight values to defined a weighted order.

32. A method of decoding symbols encoded in a plurality of symbologies, the method comprising the steps of:

acquiring data from a first symbol;

decoding the data from the first symbol based on a symbology determined from the plurality of symbologies; and updating a priority table to reflect the symbology of the first symbol.

* * * * *

UNITED STATES PATENT AND TRADEMARK OFFICE
CERTIFICATE OF CORRECTION

PATENT NO : 6,095,422
DATED : August 1, 2000
INVENTOR(S): Kenneth Yuji Ogami

It is certified that error appears in the above-identified patent and that said Letters Patent are hereby corrected as shown below:

Column 14, line 10, "widow" should be --window--;

Column 14, line 22, "widow" should be --window--; and

Column 14, line 35, "widow" should be --window--.

Signed and Sealed this

Tenth Day of April, 2001

*Attest:*

NICHOLAS P. GODICI

*Attesting Officer*     Acting Director of the United States Patent and Trademark Office